United States Patent
Luethi

[11] 3,927,119
[45] Dec. 16, 1975

[54] BIS-STILBENE COMPOUNDS

[75] Inventor: Christian Luethi, Muenchenstein, Switzerland

[73] Assignee: Ciba-Geigy AG, Basel, Switzerland

[22] Filed: May 22, 1974

[21] Appl. No.: 472,391

Related U.S. Application Data

[62] Division of Ser. No. 230,931, March 1, 1972, Pat. No. 3,843,718.

[30] Foreign Application Priority Data

Mar. 5, 1971 Switzerland............... 3235/71
Feb. 3, 1972 Switzerland............... 1608/72

[52] U.S. Cl.............. 260/613 A; 252/99; 252/527; 252/89
[51] Int. Cl.²........................................ C07C 43/20
[58] Field of Search..................... 260/613 A, 613 R

[56] References Cited
UNITED STATES PATENTS

3,177,153  4/1965  Pommer et al. ............... 252/301.2
3,177,208  4/1965  Stilz et al. ..................... 260/240

*Primary Examiner*—Bernard Helfin
*Attorney, Agent, or Firm*—Joseph G. Kolodny; Edward McC. Roberts; Prabodh I. Almaula

[57] ABSTRACT

The present invention relates to new bis-stilbene compounds of the formula (1)

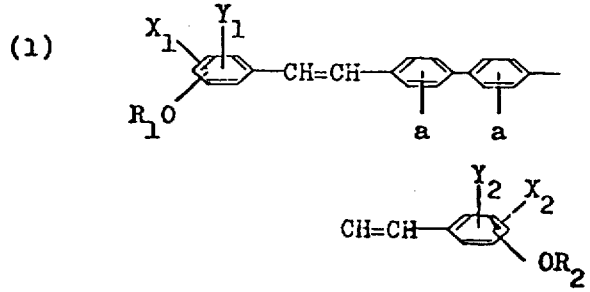

wherein $R_1$ and $R_2$ are identical or different and denote alkyl with 5 to 18 carbon atoms, substituted alkyl with a total of 2 to 20 carbon atoms, or alkenyl with 3 to 4 carbon atoms, $X_1$ and $X_2$ are identical or different and denote hydrogen, alkoxy with 1 to 4 carbon atoms, halogen, alkenyl with 3 to 4 carbon atoms or alkyl with 1 to 4 carbon atoms, $Y_1$ and $Y_2$ are identical or different and denote hydrogen, halogen, alkenyl with 3 to 4 carbon atoms or alkyl with 1 to 4 carbon atoms, a represents hydrogen, halogen, alkoxy with 1 to 4 carbon atoms or alkyl with 1 to 4 carbon atoms, and the parapositions are free of alkoxy groups or $R_1O-$ and $R_2O-$ groups.

The new compounds are useful as optical brighteners.

1 Claim, No Drawings

BIS-STILBENE COMPOUNDS

This is a division of application Ser. No. 230,931, filed on Mar. 1, 1972, and now U.S. Pat. No. 3,843,718.

The present invention relates to new bis-stilbene compounds, their use as optical brighteners, and processes for their manufacture.

French Pat. No. 1,576,018 already discloses bis-stilbene compounds of related structure and their usability as optical brighteners. As a further development of these investigations, some selected types of compound have now been discovered which, because of special substitution characteristics, display particularly advantageous properties, above all for certain fields of use.

The new compounds according to the present invention generally correspond to the formula

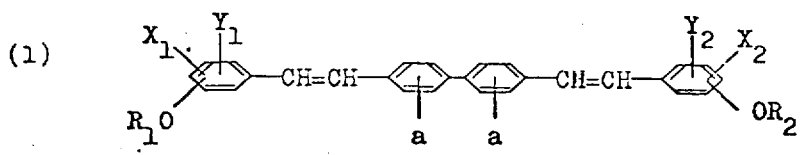

wherein $R_1$ and $R_2$ are identical or different and denote alkyl with 5 to 18 carbon atoms, substituted alkyl with a total of 2 to 20 carbon atoms, or alkenyl with 3 to 4 carbon atoms, $X_1$ and $X_2$ are identical or different and denote hydrogen, alkoxy with 1 to 4 carbon atoms, halogen, alkenyl with 3 to 4 carbon atoms or alkyl with 1 to 4 carbon atoms, $Y_1$ and $Y_2$ are identical or different and denote hydrogen, halogen, alkenyl with 3 to 4 carbon atoms or alkyl with 1 to 4 carbon atoms, a represents hydrogen, halogen, alkoxy with 1 to 4 carbon atoms or alkyl with 1 to 4 carbon atoms, and the parapositions are free of alkoxy groups or $R_1O$— and $R_2O$— groups.

Preferred groups of compounds within the framework of the formula (1) can be defined by the formulae (2) to (5) listed below:

a. Compounds of the formula

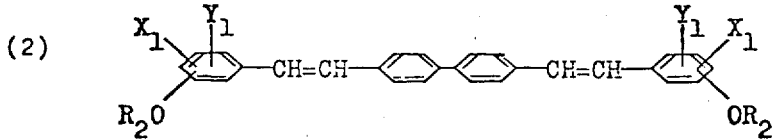

wherein $R_2$ denotes alkyl with 5 to 18 carbon atoms, alkenyl with 3 to 4 carbon atoms or a substituted alkyl group with a total of 2–12 carbon atoms, of which the substituents can be phenyl, phenyl substituted by lower alkyl or halogen, carboxyl, including its salts, carbalkoxy or carbophenoxy, carbonamido with an optionally substituted amido group, the sulpho group including its salts, nitrile, halogen, hydroxyl or alkoxy and wherein furthermore $X_1$ represents hydrogen, alkoxy with 1 to 4 carbon atoms, halogen, alkenyl with 3 to 4 carbon atoms or alkyl with 1 to 4 carbon atoms, $Y_1$ represents hydrogen or halogen, alkenyl with 3 to 4 carbon atoms or alkyl with 1 to 4 carbon atoms and wherein the para-positions are free of alkoxy groups or $R_2O$— groups.

b. Compounds of the formula

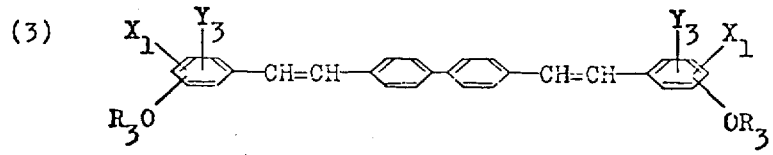

wherein $R_3$ denotes alkenyl with 3 to 4 carbon atoms or a substituted alkyl group with a total of 2–8 carbon atoms, whereof the substituents can be phenyl, phenyl substituted by lower alkyl or halogen, carboxyl including its salts, carbalkoxy, carbonamido with an optionally substituted amido group, the sulpho group including its salts, nitrile, halogen, hydroxyl or alkoxy and wherein furthermore $X_1$ represents hydrogen, alkoxy with 1 to 4 carbon atoms or alkyl with 1 to 4 carbon atoms and $Y_3$ represents hydrogen or halogen, and wherein the para-positions are free of alkoxy groups or $R_3O$— groups.

c. Compounds of the formula

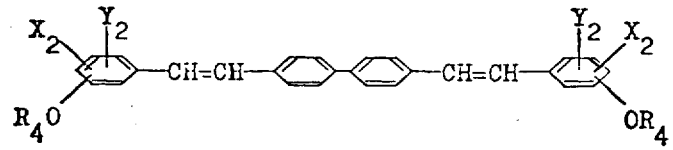

wherein the substituents $R_4O$— occupy the positions 2 or 3 and wherein $R_4$ denotes carboxyl with 2 to 12 carbon atoms or its alkali, ammonium and amine salts, N-mono- and N,N-di-(hydroxyalkyl)-carbonamidoalkyl with 4 to 8 carbon atoms, sulphonic acid alkyl with 2 to 4 carbon atoms or its alkali, ammonium and amine salts, $X_2$ represents hydrogen, alkoxy with 1 to 4 carbon atoms, chlorine, bromine, alkenyl with 3 to 4 carbon atoms or alkyl with 1 to 4 carbon atoms, $Y_2$ represents hydrogen, chlorine, bromine, alkenyl with 3 to 4 carbon atoms or alkyl with 1 to 4 carbon atoms and wherein the para-positions are free of alkoxy groups or $R_4O$— groups.

d. Compounds of the formula (5) 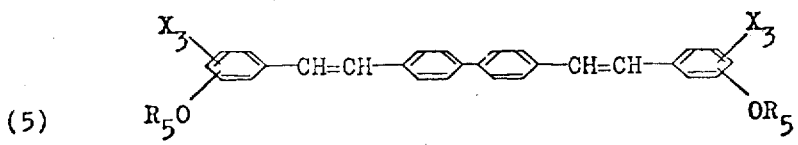

wherein the substituents $R_5O-$ occupy the positions 2 or 3 and wherein $R_5$ denotes carboxyalkyl with 2 to 12 carbon atoms or its alkali salts, carbalkoxyalkyl with up to 18 carbon atoms, sulphoalkyl with 2 to 3 carbon atoms (as the alkali salt or free acid), benzyl, which may be substituted by chlorine or by alkyl groups containing 1 to 4 carbon atoms, or alkenyl with 3 to 4 carbon atoms, $X_3$ represents hydrogen or alkoxy with 1 to 4 carbon atoms and the para-positions are free of alkoxy groups or $R_5O-$ groups.

e. Compounds of the formula (6) 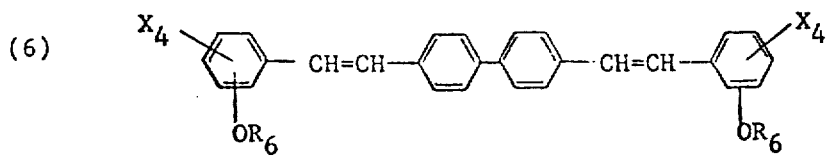

wherein $R_6$ denotes alkyl with 5 to 12 carbon atoms, alkenyl with 3 to 4 carbon atoms, halogenoalkyl, cyanoalkyl or alkoxyalkyl with 2–6 carbon atoms, benzyl, or benzyl substituted by chlorine or methyl, carboxyalkyl with 2 to 12 carbon atoms or its alkali, ammonium and amine salts, carbalkoxyalkyl with 2–10 carbon atoms, carbophenoxyalkyl with 1–3 carbon atoms in the alkyl part and phenyl optionally substituted by methyl, carbonamidoalkyl with 2 to 4 carbon atoms, N-mono- and N,N-di-(hydroxyalkyl)-carbonamidoalkyl with 4 to 8 carbon atoms, N-mono- and N,N-di-(alkyl)-carbonamidoalkyl with 2–10 carbon atoms, which can optionally be substituted by dialkyl(1 to 3 carbon atoms)-amino groups, N-phenyl-carbonamidoalkyl with 1–3 carbon atoms in the alkyl part and optionally with chlorine as a substituent in the phenyl radical, sulphonic acid alkyl with 2–4 carbon atoms or its alkali, ammonium or amine salts, and $X_4$ represents hydrogen, chlorine, bromine, methoxy, alkyl with 1–4 carbon atoms or alkenyl with 3–4 carbon atoms, and the para-positions are free of methoxy groups or $R_6O-$ groups.

In these formulae (3) to (6) it should be noted generally that — unless more detailed comments are made — the preferred halogen is chlorine, alkyl is to be understood as both straight-chain and branched alkyl, preferably with a non-branched carbon atom in the α-position to the ether bridge and, in the case of substituted alkyl groups, the number of carbon atoms of the alkyl part is normally 1 to 18, preferably 1 to 4. Amongst possible alkenyl groups — as provided, for example, for $R_2$ — the allyl group is preferred and amongst lower alkyl groups those with 1 to 4 carbon atoms are always to be understood, unless otherwise stated. Possible salts of carboxyl groups and sulpho groups are above all the alkali, alkaline earth, ammonium and amine salts. By way of explanation of the concept of the carbonamido group and its substitution products it should be noted that this is to be understood to include both the $-CO-NH_2$ group and its mono-substitution and di-substitution products, and of course cyclic amide derivatives (morpholino, piperidino and the like) are also to be regarded as included. Though alkylamide derivatives (including substituted alkylamide derivatives such as hydroxyalkyl-, cyanoalkyl-, carboxyalkyl-, carbalkoxyalkyl- and halogenoalkyl-amide derivatives) are of predominant interest and here normally the number of carbon atoms is up to 18, it is not intended to exclude different amide derivatives.

The bis-stilbene compounds of the formula (1) and of the subsidiary formulae can be manufactured analogously to methods which are in themselves known. Explaining this for the example of compounds of the formula (2), the procedure followed is, for example, that about 1 mol equivalent of a compound of the formula (7) 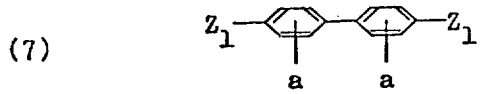

is reacted with about 1 mol equivalent of a compound of the formula (8) 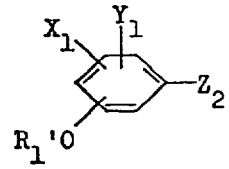

and about 1 mol equivalent of a compound of the formula (9) 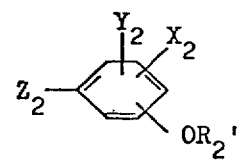

with one of the symbols $Z_1$ and $Z_2$ denoting a O=CH— group and the other denoting one of the groupings of the formulae

(10) 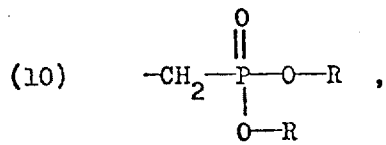 , (11) 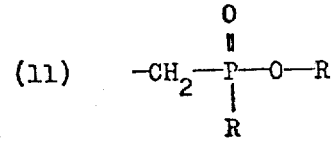

(12) 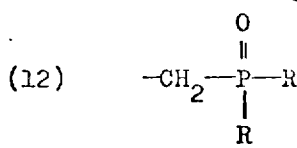   and   (13) 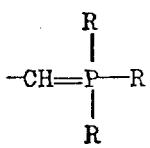

wherein R represents an alkyl radical which is optionally substituted further, preferably an alkyl radical with up to 6 carbon atoms, an aryl radical, preferably a phenyl radical, a cycloalkyl radical, preferably a cyclohexyl radical or an aralkyl radical, preferably a benzyl radical.

In the abovementioned formulae, the symbols $X_1$, $X_2$, $Y_1$ and $Y_2$ have the meaning given earlier. $R_1'$ and $R_2'$ have the meaning given for $R_1$ and $R_2$ under the formulae (2) and (3), with the restriction that the meaning of modified carboxyl groups (carbalkoxy, carbophenoxy and optionally substituted carbonamide group) is to be excluded.

The modification of the carboxyl groups is effected after condensation of the compounds (8) or (9) with the diphenyl component, by converting compounds according to the formulae (2) or (3) or subsidiary formulae, having free carboxyl groups, or their alkali salts, into corresponding acid halides and manufacturing the corresponding esters or amides therefrom in accordance with methods which are in themselves known.

In accordance with the reaction principle explained above, it is possible, for example, to react dialdehydes of the formula

(14) 

with monofunctional compounds of the formula

(15) 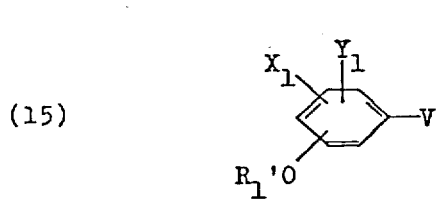

or

(16) 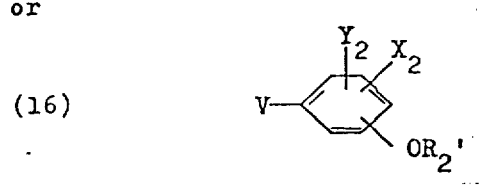

or monoaldehydes of the formula

(17) 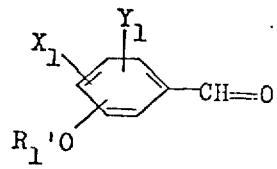

or

(18) 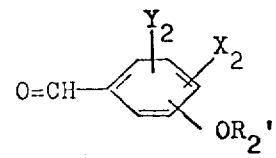

with bifunctional compounds of the formula

(19) 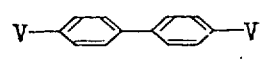

wherein V denotes one of the phosphorus-containing substituents of the formulae (10), (11), (12) or (13).

The phosphorus compounds of the formulae (15), (16) and (19) here required as starting substances are obtained in a manner which is in itself known by reacting halogenomethyl compounds, preferably chloromethyl or bromomethyl compounds of the formula

(20) 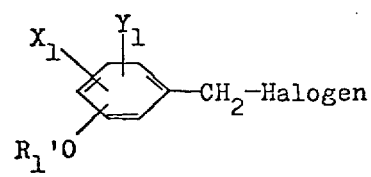

or

(21) 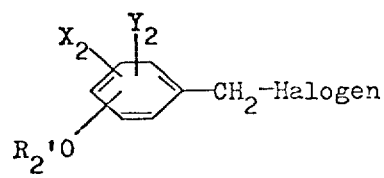

or

(22) 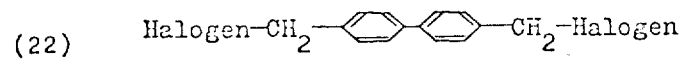

with phosphorus compounds of the formulae

(23) 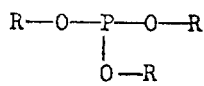

(24) 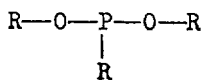

(25) 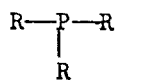 or

(26) 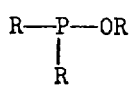

In these formulae, R has the indicated meaning, with radicals R bonded to oxygen being preferably lower alkyl groups whilst radicals R directly bonded to phosphorus are preferably aryl radicals such as benzene radicals. The phosphorus compound of the formula (12) can also be obtained by reaction of halogenomethyl compounds, preferably chloromethyl or bromomethyl compounds of the formulae (20), (21) or (22), with chlorodiphenylphosphine and subsequent reaction with an alcohol of the formula R—OH (the meaning of R being as defined above), for example with methanol or with water.

To manufacture compounds according to the formula (2) it is possible to use, in particular, those of the above-mentioned process variants according to which about 1 mol equivalent of a compound of the formula

(27) 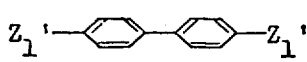

is reacted with about on mol equivalent each of a compound of the formula (17) and (18), with $Z_1'$ denoting a grouping of the formulae (10), (11), (12) and (13).

A variant of particular practical importance is to use, as the diphenyl components according to the formula (19), those which correspond to the formula dioxane, as well as dimethylsulphoxide, formamide and N-methylpyrrolidone. Polar organic solvents such as dimethylformamide and dimethylsulphoxide are particularly suitable. Some of the reactions can also be carried out in aqueous solution.

The temperature at which the reaction is carried out can vary within wise limits. It is determined ($\alpha$) by the inertness of the solvent used towards the reactants, especially towards the strongly basic alkali compounds, ($\beta$) by the reactivity of the condensation partners and ($\gamma$) by the activity of the combination of solvent and base as a condensation agent.

In practice, accordingly, temperatures between about 10° and 100°C are in general used, especially if dimethylformamide or dimethylsulphoxide are employed as solvents. The preferred temperature range is 20° to 60°C. However, under certain circumstances higher temperatures can also be employed if this is desired for reasons of time saving or if a less active but cheaper condensation agent is to be employed. In principle, reaction temperatures in the range of 10° to 180°C are thus also possible.

Strongly basic alkali compounds which can be used are above all the hydroxides, amides and alcoholates (preferably those of primary alcohols containing 1 to 4 carbon atoms) of the alkali metals, amongst which those of lithium, sodium and potassium are, for economic reasons, of predominant interest. In principle, and in special cases, it is however also possible to employ successfully alkali sulphides and alkali carbonates, arylalkali compounds, such as, for example, phenyllithium, or strongly basic amines (including ammonium bases, for example trialkylammonium hydroxides).

When using the processes described above for the manufacture of asymmetrical derivatives (which are of lesser importance), the competing reaction of the three reactants in the first place yields mixtures of asymmetrically substituted bis-stilbene compounds according to the formula (2) and the two corresponding symmetrically substituted bis-stilbenes. The separation of these components, if desired, is effected by fractional recrystallisation, column chromatography and/or utilisation of the different behaviour of certain groups (for example carboxylic acid groups and sulphonic acid groups) towards certain reagents (for example aqueous alkaline solutions).

The aldehydes which are circumscribed, for example, by the formulae (17) and (18), are not all known, but the manufacture of a large number is described in the literature [see, for example, Ann. 401, page 91 to 119

(28) 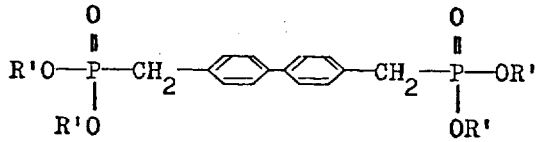

wherein R' denotes an alkyl group with 1 to 6 carbon atoms.

The manufacturing process is advantageously carried out in inert solvents. As examples thereof, there may be mentioned hydrocarbons such as toluene and xylene or alcohols such as methanol, ethanol, isopropanol, butanol, glycols, glycol-ethers such as 2-methoxyethanol, hexanols, cyclohexanol and cyclooctanol, and also ethers such as diisopropyl ether, tetrahydrofurane and (1913); J. Pr. Ch. 77, page 364 to 366 (1908); Ber. 38, page 1676 (1905); DRP 209,608; Ann. 357, page 313 to 383 (1907); J. Med. Chem. 12, page 420 to 424 (1969)]. They are obtained almost without exception by etherification of the corresponding hydroxybenzaldehydes. Hitherto unknown aldehydes are also obtainable by analogous processes. The section dealing with examples deals especially with the manufacture of some aldehydes.

Within the framework of the present invention, preferred practical significance attaches to the reaction — according to the formulae (17) to (19) — of aldehydes of the formulae

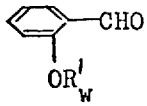 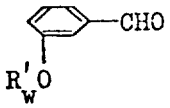 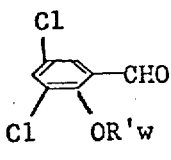

(29)  (30)  (31)

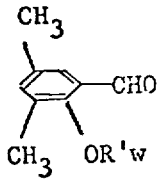 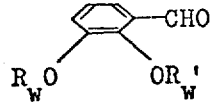

(32)  (33)

wherein $R_{w}$ denotes a lower alkyl group and $R_{w}'$ represents an allyl, benzyl, acetic acid, propionic acid, butyric acid, propylenesulphonic acid or alkyl group with 8 to 18 carbon atoms, with 4,4'-di-(alkoxyphosphonomethyl)-di-phenyl, or the compounds according to the formula (3) obtained therefrom, with carboxyl groups being appropriately esterified or amidised, if desired.

The new compounds defined above show a more or less pronounced fluorescence in the dissolved or finely divided state. They can be used for the optical brightening of the most diverse synthetic, semi-synthetic or natural organic materials or substances which contain such organic materials.

The following groups of organic materials, to the extent that an optical brightening thereof is relevant, may be mentioned as examples of such materials, without the list which follows being intended to express any restriction thereto:

I. SYNTHETIC ORGANIC HIGH MOLECULAR MATERIALS a. Polymerisation products based on organic compounds containing at least one polymerisable carbon-carbon double bond, that is to say their homopolymers or copolymers as well as their after-treatment products such as, for example, cross-linking, grafting or degradation products, polymer blends, products obtained by modification of reactive groups, for example polymers based on α,β-unsaturated carboxylic acids or derivatives of such carboxylic acids, especially on acrylic compounds (such as, for example, acrylic esters, acrylic acid, acrylonitrile, acrylamides and their derivatives or their methacryl analogues) on olefine hydrocarbons (such as, for example, ethylene, propylene, styrenes or dienes, and also so-called ABS polymers), and polymers based on vinyl and vinylidene compounds (such as, for example, vinyl chloride, vinyl alcohol and vinylidene chloride);

b. Polymerisation products which are obtainable by ring opening, for example, polyamides of the polycaprolactam type, and also polymers which are obtainable both via polyaddition and via polycondensation, such as polyethers or polyacetals;

c. Polycondensation products or precondensates based on bifunctional or polyfunctional compounds possessing condensable groups, their homocondensation and co-condensation products, and after-treatment products, such as, for example, polyesters, especially saturated (for example ethylene glycol terephthalic acid polyester) or unsaturated (for example maleic acid dialcohol polycondensates as well as their cross-linking products with copolymerisable vinyl monomers), non-branched as well as branched (also based on polyhydric alcohols, such as, for example, alkyd resins) polyesters, polyamides (for example hexamethylenediamine adipate), maleate resins, melamine resins, their precondensates and analogues, polycarbonates and silicones;

d. Polyaddition products such as polyurethanes (crosslinked and non-crosslinked) and epoxide resins.

II. Semi-synthetic organic materials, for example, cellulose esters of varying degrees of esterification (so-called 2½-acetate or triacetate) or cellulose ethers, regenerated cellulose (viscose or cuprammonium cellulose), or their after-treatment products, and casein plastics.

III. Natural organic materials of animal or vegetable origin, for example based on cellulose or proteins, such as cotton, wool, linen, silk, natural lacquer resins, starch and casein.

The organic materials to be optically brightened can be in the most diverse states of processing (raw materials, semi-finished goods or finished goods). On the other hand, they can be in the form of structures of the most diverse shapes, that is to say, for example, predominantly three-dimensional bodies such as sheets, profiles, injection mouldings, various machined articles, chips, granules or foams, and also as predominantly two-dimensional bodies such as films, foils, lacquers, coverings, impregnations and coatings, or as predominantly one-dimensional bodies such as filaments, fibres, flocks and wires. The said materials can, on the other hand, also be in an unshaped state, in the most diverse homogeneous or inhomogeneous forms of division, such as, for example, in the form of powders, solutions, emulsions, dispersions, latices, pastes or waxes.

Fibre materials can, for example, be in the form of endless filaments (stretched or unstretched), staple fibres, flocks, hanks, textile filaments, yarns, threads, fibre fleeces, felts, waddings, flock structures or woven textile fabrics or textile laminates, knitted fabrics and paper, cardboards or paper pulps.

The compounds to be used according to the invention are of importance, inter alia, for the treatment of organic textile materials, especially woven textile fabrics. Where fibres, which can be in the form of staple fibres or endless filaments or in the form of hanks, woven fabrics, knitted fabrics, fleeces, flock substrates or laminates, are to be optically brightened according to the invention, this is advantageously effected in an aqueous medium, wherein the compounds in question are present in a finely divided form, (suspensions, so-called micro-dispersions or possibly solutions). If desired, dispersing agents, stabilisers, wetting agents and further auxiliaries can be added during the treatment.

Depending on the type of brightener compound used, it may prove advantageous to carry out the treatment in a neutral or alkaline or acid bath. The treatment is usually carried out at temperatures of about 20° to 140°C, for example at the boiling point of the bath or near it (about 90°C). Solutions or emulsions in organic solvents can also be used for the finishing, according to the invention, of textile substrates, as is practised in the dyeing trade in so-called solvent dyeing (padthermofix application, or exhaustion dyeing processes in dyeing machines).

The new optical brighteners according to the present invention can further be added to, or incorporated in, the materials before or during their shaping. Thus they can for example be added to the compression moulding composition or injection moulding composition during the manufacture of films, foils (for example milling into hot polyvinyl chloride) or mouldings.

Where fully synthetic or semi-synthetic organic materials are being shaped by spinning processes or via spinning compositions, the optical brighteners can be applied in accordance with the following processes:

Addition to the starting substances (for example monomers) or intermediates (for example precondensates or prepolymers), that is to say before or during the polymerisation, polycondensation or polyaddition, Powdering onto polymer chips or granules for spinning compositions, Bath dyeing of polymer chips or granules for spinning compositions, Metered addition to spinning melts or spinning solutions, and Application to the two before stretching.

The new optical brighteners according to the present invention can, for example, also be employed in the following use forms:

a. Mixed with dyestuffs (shading) or pigments (coloured pigments or especially, for example, white pigments), or as an additive to dye baths, printing pastes, discharge pastes or reserve pastes, or for the after-treatment of dyeings, prints or discharge prints.

b. Mixed with so-called "carriers", wetting agents, plasticisers, swelling agents, anti-oxidants, light protection agents, heat stabilisers and chemical bleaching agents (chlorite bleaches or bleaching bath additives).

c. Mixed with cross-linking agents or finishes (for example starch or synthetic finishes), and in combination with the most diverse textile finishing processes, especially synthetic resin finishes (for example crease-proof finishes such as "wash-and-wear", "permanent-press" or "no-iron"), as well as flameproof finishes, soft handle finishes, antisoiling finishes or anti-static finishes, or antimicrobial finishes.

d. Incorporation of the optical brighteners into polymeric carriers (polymerisation, polycondensation or polyaddition products), in a dissolved or dispersed form, for use, for example, in coating compositions, impregnating compositions or binders (solutions, dispersions and emulsions) for textiles, fleeces, paper and leather.

e. As additives to so-called "master batches".

f. As additives to the most diverse industrial products in order to render these more marketable (for example improving the appearance of soaps, detergents and pigments.

g. In combination with other optically brightening substances.

h. In spinning bath preparations, that is to say as additives to spinning baths such as are used for improving the slip for the further processing of synthetic fibres, or from a special bath before the stretching of the fibre.

i. As scintillators for various purposes of a photographic nature, such as, for example, for electrophotographic reproduction or supersensitisation and for the optical brightening of photographic layers, optionally in combination with white pigments, such as for example $TiO_2$.

If the brightening process is combined with textile treatment methods or finishing methods, the combined treatment can in many cases advantageously be carried out with the aid of appropriate stable preparations, which contain the optically brightening compounds in such concentration that the desired brightening effect is achieved.

In certain cases, the brighteners are made fully effective by an after-treatment. This can, for example, represent a chemical treatment (for example acid treatment), a thermal treatment (for example heat) or a combined chemical/thermal treatment. Thus, for example, the appropriate procedure to follow in optically brightening a series of fibre substrates, for example of polyester fibres, with the brighteners according to the invention is to impregnate these fibres with the aqueous dispersions (optionally also solutions) of the brighteners at temperatures below 75°C, for example at room temperature, and to subject them to a dry heat treatment at temperatures above 100°C, it being generally advisable additionally to dry the fibre material beforehand at a moderately elevated temperature, for example at not less than 60°C and up to about 130°C. The heat treatment in the dry state is then advantageously carried out at temperatures between 120° and 225°C, for example by heating in a drying chamber, by ironing within the specified temperature range or by treatment with dry, superheated steam. The drying and dry heat treatment can also be carried out in immediate succession or be combined in a single process stage.

The amount of the new optical brighteners to be used according to the invention, relative to the material to be optically brightened, can vary within wide limits. A distinct and durable effect is already achievable with very small amounts, in certain cases, for example, amounts of 0.0001 percent by weight. However, amounts of up to about 0.8 percent by weight and optionally up to about 2 percent by weight can also be employed. For most practical purposes, amounts between 0.0005 and 0.5 percent by weight are of preferred interest.

The new optical brighteners are also suitable for use as additives for wash baths or to industrial detergents and domestic detergents, and can be added in various ways. They are appropriately added to wash baths in the form of their solutions in water or in organic solvents, or in a finely divided form as aqueous dispersions. They are advantageously added to domestic detergents or industrial detergents in any stage of the process of manufacture of the detergent, for example the so-called "slurry" before spray-drying the detergent powder, or during the preparation of liquid detergent combinations. They can be added both in the form of a solution or dispersion in water or other solvents and without auxiliaries, as a dry brightener powder. The brighteners can for example be mixed, kneaded or ground with the detergent substances and mixed in this form into the finished washing powder. They can however also be sprayed as a solution or pre-dispersion onto the finished detergent.

Possible detergents are the known mixtures of washactive substances such as, for example, soap in the form of chips and powders, synthetic detergents, soluble salts of sulphonic acid half-esters of higher fatty alcohols, arylsulphonic acids with higher and/or multiple alkyl substituents, sulphocarboxylic acid esters of medium to higher alcohols, fatty acid acylaminoalkyl- or -aminoarylglycerinesulphonates, phosphoric acid esters of fatty alcohols and the like. So-called "builders" which can be used are, for example, alkali polyphosphates and polymetaphosphates, alkali pyrophosphates, alkali salts of carboxymethylcellulose and other "soil redeposition inhibitors" and also alkali silicates, alkali carbonates, alkali borates, alkali perborates, nitrilotriacetic acid, ethylenediaminotetraacetic acid, and foam stabilisers such as alkanolamides of higher fatty acids. Furthermore, the detergents can contain, for example: Antistatic agents, agents which protect the skin and restore fats, such as lanoline, enzymes, anti-microbial agents, perfumes and dyestuffs.

The new optical brighteners have the particular advantage that they are active even in the presence of active chlorine donors, such as, for example, hypochlorite, and can be used without significant loss of the effects in wash baths containing non-ionic detergents, for example alkylphenol-polyglycol-ethers.

The compounds according to the invention are added in amounts of 0.005 to 1% or more, relative to the weight of the liquid or pulverulent, finished detergent. Wash liquors which contain the indicated amounts of the optical brighteners claimed, impart a brilliant appearance in daylight when used for washing textiles of cellulose fibres, polyamide fibres, cellulose fibres with a high quality finish, polyester fibres, wool and the like.

The wash treatment is carried out, for example, as follows:

The textiles indicated are treated for 1 to 30 minutes at 20° to 100°C in a wash bath which contains 1 to 10 g/kg of a synthetic composite detergent and 0.05 to 1% of the brighteners claimed, relative to the weight of the detergent. The liquor ratio can be 1:3 to 1:50. After washing, the textiles are rinsed and dried in the usual manner. The wash bath can contain 0.2 g/l of active chlorine (for example as hypochlorite) or 0.1 to 2 g/l of sodium perborate, as a bleaching additive.

In the examples parts, unless otherwise stated, are always parts by weight, and percentages always percentages by weight. Unless otherwise stated, the melting points and boiling points are uncorrected.

MANUFACTURE OF SOME BENZALDEHYDE ETHERS (STARTING PRODUCTS)

The instructions below serve as examples of the manufacture of new aldehydes used in the subsequent examples.

A. 43.6 g of commercial sodium hydride (about 55% strength) are suspended in 800 ml of (anhydrous) dimethylformamide. 152 g of o-vanillin, diluted with 200 ml of dimethylformamide, are added dropwise over the course of 30 minutes at 20° to 25°C whilst cooling and the mixture is stirred for a further 3 hours at 20° to 25°C. 168 g of bromoacetic acid methyl ester are then run in over the course of half an hour whilst cooling and the mixture is thereafter stirred for a further 18 hours at 20° to 25°C. After it has been poured out onto ice/water and the precipitate has been filtered off and rinsed with water, the product is dried in vacuo at 30° to 40°C. 188 g of the aldehyde of the formula

(34) 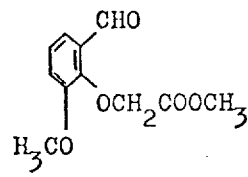

of melting point 78° to 81°C are obtained. A sample for analysis melts at 81° to 82°C after recrystallisation from heptane.

The methyl ester can be saponified to the free acid by saponification for 6 hours at 20° to 25°C with a methanolicaqueous potassium hydroxide solution: Melting point of the free acid 120° to 122°C (from water).

Analogously, for example, the aldehyde of the formula

(35) 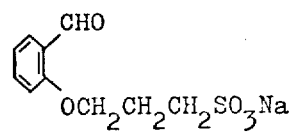

can be manufactured by employing propanesultone in the reaction instead of a bromine compound.

B. 29 g of sodium methylate are suspended in 400 ml of anhydrous dimethylformamide. A solution of 76 g of 2-hydroxy-3-methoxy-benzaldehyde is added dropwise at 20 to 25°C over the course of half an hour, 90 g of benzylbromide are mixed in and the mixture is kept at 20° to 25°C for 20 hours, 50°C for 30 minutes and 70° to 75°C for 30 minutes. 2,500 ml of water are then added followed by 50 ml of glacial acetic acid, and the oil is extracted with chloroform. After distilling off the solvent, the residue is fractionated, whereupon 76.5 g of 2-benzyloxy-3-methoxybenzaldehyde pass over at boiling point$_{11\ mm}$ = 214° to 215°C.

C. 183 g of m-Hydroxybenzaldehyde and 182 g of allyl bromide in 500 ml of absolute alcohol are kept under reflux for 5 hours in the presence of 210 g of potassium carbonate. The filtrate is freed of the alcohol on a rotary evaporator and is fractionally distilled. 3-m-Allyloxybenzaldehyde passes over at boiling point$_{14\ mm}$ = 133° to 134°C (176 g)

ALDEHYDES MANUFACTURED ANALOGOUSLY TO OTHER INSTRUCTIONS IN THE LITERATURE

Further aldehydes manufactured according to Example A:

|  | Melting Point (°C) | Boiling Point t (°C) | p (mm) |
|---|---|---|---|
| 2-n-Octoxybenzaldehyde |  | 194–6 | 12 |
| 2-Carbomethoxymethoxybenzaldehyde | 54–5 |  |  |
| 3-Carbomethoxymethoxybenzaldehyde | 31–3 | 133–6 | 0.15 |
| Sodium salt of 2-sulphopropoxybenzaldehyde | Decomposition |  |  |
| 3-n-Octoxybenzaldehyde |  | 204–9 | 17 |
| 3-Carboxymethoxybenzaldehyde | 114–6 |  |  |
| Sodium salt of 3-sulphopropoxybenzaldehyde | Decomposition |  |  |
| 2-Carboxymethoxybenzaldehyde | 129–31 |  |  |
| 2-n-Octadecyloxy-3-methoxybenzaldehyde | 63–4 |  |  |
| Sodium salt of 2-sulphopropoxy-3-methoxybenzaldehyde | 185–7 |  |  |
| 2-(2-Ethyl-hexyloxy)-benzaldehyde |  | 174–6 | 11 |
| 3-n-Pentoxy-X-alkylbenzaldehyde (Note 1) |  | 132–8 | 0.05 |
| 2-(4-Bromo-n-butoxy)benzaldehyde |  | 154–5 | 11 |
| 2-(3-Cyano-n-propoxy)benzaldehyde | 50–1 |  |  |
| -2(3-Carboxy-n-propoxy)benzaldehyde | 89–91 |  |  |
| 2-(3-Carbethoxy-n-propoxy)benzaldehyde |  | 128–30 | 0.14 |
| 2-n-Dodecyloxy-3-alkylbenzaldehyde |  | 176–95 | 0.2 |
| Sodium salt of 2-sulphopropoxy-3,5-dimethylbenzaldehyde | Decomposition |  |  |
| 2-Carboxymethoxy-3-methyl-5-tert.butylbenzaldehyde |  | 150–3 | 0.05 |
| 2-Carbomethoxymethoxy-3-methyl-5-tert.butylbenzaldehyde |  | 133–7 | 0.05 |
| 2-Dodecyloxy-3,5-dichlorobenzaldehyde |  | 178–84 | 0.15 |
| 2-Carboxymethoxy-3,5-dichlorobenzaldehyde | 167–9 |  |  |
| 2-Carbomethoxymethoxy-3,5-dichlorobenzaldehyde | 117–8 |  |  |
| Sodium salt of 2-sulphopropoxy-X-crotyl-benzaldehyde (Note 1) | Decomposition |  |  |

Further aldehydes manufactured according to Example B:

|  | Melting Point (°C) | Boiling Point t (°C) | p (mm) |
|---|---|---|---|
| 3-Benzyloxybenzaldehyde | 56–7 |  |  |
| 2-Benzyloxybenzaldehyde |  | 205–6 | 11 |
| 2-Benzyloxy-3-allylbenzaldehyde |  | 197–208 | 11 |
| 2-Benzyloxy-3-methyl-5-tert.butylbenzaldehyde |  | 153–4 | 0.05 |
| 2-Benzyloxy-3,5-dichlorobenzaldehyde | 82–3 |  |  |
| 3-(4-Methylbenzyloxy)-benzaldehyde |  | 142–5 | 0.03 |
| 2-(3-Chlorobenzyloxy)-benzaldehyde | 43–5 |  |  |
| 2-Benzyloxy-X-crotyl-benzaldehyde (Note 1) |  | 133–49 | 0.03 |

Further aldehydes manufactured according to Example C and according to methods from Liebigs Annalen, Vol. 401, pages 91 to 119 (1913).

|  | Melting Point (°C) | Boiling Point t (°C) | p (mm) |
|---|---|---|---|
| 2-Allyloxybenzaldehyde |  | 136–7 | 13 |
| 2-Hydroxy-3-allylbenzaldehyde | — | — | — |
| 2-Allyloxy-3-methoxybenzaldehyde |  | 152–5 | 12 |
| 3-Hydroxy-X-allylbenzaldehyde (Note 1) |  | 169–73 | 14 |
| 2-Crotyloxybenzaldehyde |  | 85–6 | 0.04 |
| 2-Hydroxy-X-crotylbenzaldehyde (Note 1) |  | 190–5 | 12 |
| 2-Allyloxy-5-bromobenzaldehyde | 38–9 |  |  |

NOTE 1

The allyl rearrangement led to two different allyl isomers (presumably in the 2- and 4-position) which were employed as a mixture in the reaction to give the distyrylbiphenyl derivatives claimed.

Similarly, the 2-crotyl ether gave a mixture of, presumably 3- and 5-crotyl isomers, which were also further etherified, and used, without separation.

2-Methoxymethoxybenzaldehyde, which distils at 139°–140°C at 15 mm pressure, was manufactured analogously to Example 7 of DRP 209,608.

2-Hydroxy-3,5-dimethylbenzaldehyde, melting point 21°–23°C, was manufactured according to Example 7, British Pat. No. 794,885. 2-Hydroxy-3-methyl-5-p-tert.butylbenzaldehyde, which was purified by steam distillation and is liquid at room temperature, was also obtained analogously to this example.

EXAMPLE 1

13.9 g of sodium methylate are suspended in 120 ml of anhydrous dimethylformamide. A solution of 18 g of β-(2-formylphenoxy)-acetic acid and 20 g of 4,4'-bis- (dimethoxyphosphonomethyl)-diphenyl in 80 ml of anhydrous dimethylformamide, prepared by warming to 60°C, is subsequently added dropwise over the course of about 15 minutes at 20° to 40°C. The mixture is stirred for a further 3 hours at 40° to 45°C, a further 200 ml of dimethylformamide are then added and just sufficient water is introduced at 100°C to give a clear solution. The precipitate formed after cooling is filtered off, rinsed with water and dried. 24.3 g of the compound of the formula

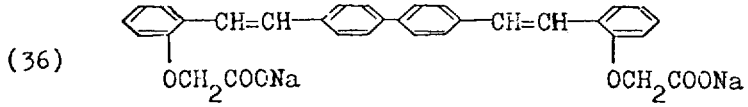

(36)

of melting point > 300°C are obtained.

EXAMPLE 2

The compound (36) from Example 1 can be converted into the free acid as follows: 18.3 g are dissolved in a warm mixture of 300 ml of dimethylformamide and 100 ml of water and the solution is run into 300 ml of 2 N hydrochloric acid whilst stirring. The product which has precipitated is filtered off, dried and recrystallised from dimethylformamide-toluene. 12.1 g of the compound of the formula

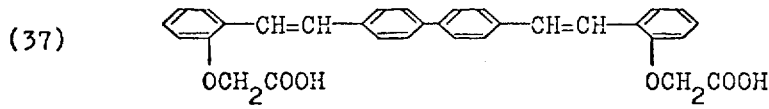

(37)

are obtained. Melting point: 263° to 267°C (decomposition).

EXAMPLE 3

7 g of the free acid of the formula (37) in 75 ml of toluene and 12 ml of thionyl chloride, with the addition of 0.1 ml of dimethylformamide, are reacted for 5 hours at 70°C. The mixture is diluted with 350 ml of toluene and filtered at the boil, and the compound which crystallises out from the filtrate is filtered off. 6.9 g of the compound of the formula

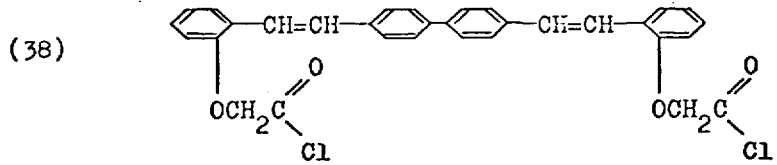

(38)

are thus obtained. Melting point: 197 to 199°C.

EXAMPLE 4

The acid chloride of the formula (38) can be converted into corresponding esters of amides by reaction with alcohols, phenols or primary/secondary amines or ammonia in accordance with known methods. If, for example, it is reacted for 4 hours under reflux with twice the calculated amount of diethanolamine in dioxane, the product of the formula

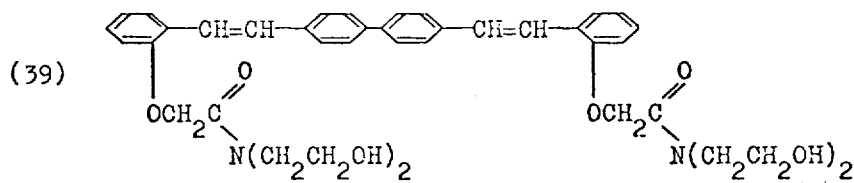

(39)

is obtained after recrystallisation from dioxane-water. On passing ammonia into a solution of the acid chloride in chlorobenzene at 110°C and filtering off the precipitate formed, the unsubstituted amide

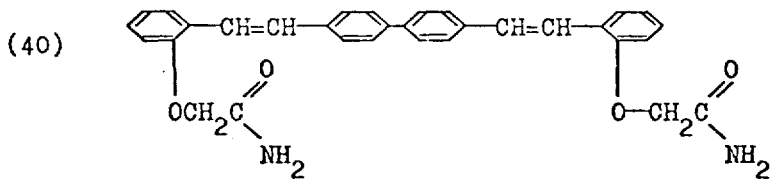

(40)

is obtained.

The following method of manufacture is suitable for amides and esters of carboxyalkyl-ethers of the bisstilbenes described here:

The corresponding acid chloride is dissolved in a small excess of a non-polar anhydrous solvent such as tetrachloroethane, toluene, chlorobenzene or xylene, the solution is cooled to room temperature, a two-fold to three-fold excess of a primary or secondary amine or an alcohol, phenol or aniline which is optionally substituted by non-reactive groups is added, the mixture is first stirred for 1 to 2 hours at room temperature and then, in the case of amines or alcohols with a boiling point below 100°C, for a further 1 to 4 hours just below this boiling point, and subsequently for a further 1 to 2 hours at the reflux temperature of the solvent. In most cases, the desired ester or amide derivative can be filtered off in an analytically pure form after cooling to 0°–5°C.

EXAMPLE 5

14.5 g of sodium methylate (97% pure) are suspended in 60 ml of anhydrous dimethylformamide. 47.0 g of m-octoxybenzaldehyde and 40 g of 4,4'-bis-(dimethoxyphosphonomethyl)-diphenyl are dissolved in 175 ml of dimethylformamide at 70°C and this solution, whilst still warm, is added dropwise over the course of about 15 minutes to the above sodium methylate suspension at 20° to 40°C. The mixture is then stirred for a further 2½ hours at 40 to 45°C. 175 ml of water are added, the mixture is neutralised with glacial acetic acid, heated to refluxing and cooled to 0°–5°C, and the product which has precipitated is filtered off. After drying and recrystallisation from nonane, 24 g of the compound of the formula

(41) 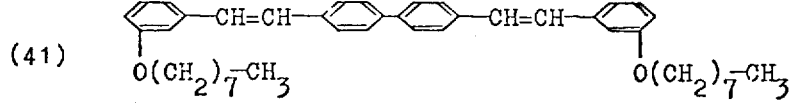

are obtained. Melting point: 182° to 183°C.

EXAMPLE 6

27.8 g of sodium methylate (97% strength) are suspended in 80 ml of anhydrous dimethylsulphoxide. 36 g of o-(carboxypropyloxy)-benzaldehyde and 40 g of 4,4'-bis-(dimethoxyphosphonomethyl)-diphenyl are dissolved in 200 ml of dimethylsulphoxide at 70°C and this solution, whilst still warm, is added dropwise over the course of about 30 minutes to the above sodium methylate suspension at 20° to 40°C. The mixture is then stirred for a further 3 hours at 45°C. The reaction mixture is poured out into 1,000 ml of 0.5 N hydrochloric acid, the whole is briefly heated to the boil and gradually cooled to room temperature, and the solid is filtered off. The filter cake is dispersed in 1,000 ml of water whilst still moist, treated with 500 ml of acetone and heated for one hour under reflux. After cooling to 20°–22°C, the product is filtered off and rinsed with water.

53.4 g of the product of the formula

(42) 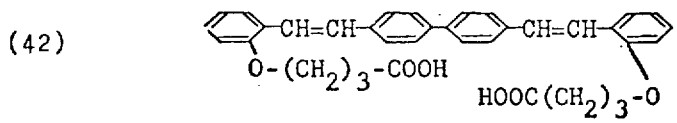

which after two recrystallisations from dimethylformamide melts at 240° to 242°C, are thus obtained.

Distyryl-biphenyl derivatives of the present invention, whereof the starting aldehydes do not possess any salt-forming groups, are obtainable analogously but with half the amount of sodium methylate.

If instead of sodium methylate, potassium methylate is employed and the mixture is poured out into water instead of into hydrochloric acid, the compound of the formula (42) is obtained in the form of its potassium salt.

EXAMPLE 7

15.7 g of potassium tert.-butylate are suspended in 100 ml of anhydrous dimethylformamide; 8.1 g of m-allyloxybenzaldehyde, 8.1 g of o-allyloxybenzaldehyde and 22.7 g of 4,4'-bis-(diethoxy-phosphonomethyl)-diphenyl are dissolved in 100 ml of dimethylformamide at 75°C and this solution, whilst still warm, is added dropwise over the course of about 20 minutes to the above potassium tert.-butylate suspension at 20° to 40°C. The mixture is then stirred for a further 4 hours at 40°C and poured out into 750 ml of water, and the material which gradually solidifies is filtered off. For purification, the dried crude product is dissolved in excess chlorobenzene, the solution is treated with 1 g of fuller's earth, the filtrate is concentrated until a precipitate appears and is then cooled to 0°–5°C, and the product is filtered off and rinsed with petroleum ether. A mixture of the three compounds

(43) 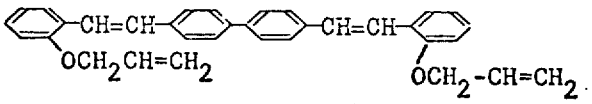

(44) 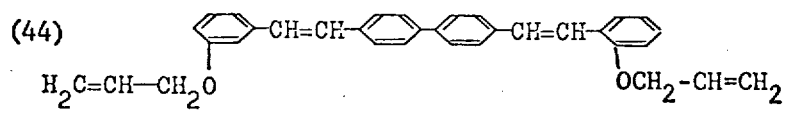

(45) 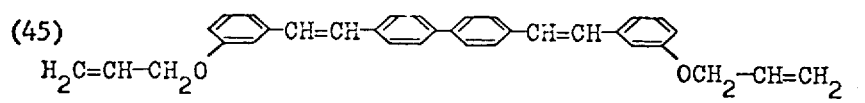

is thus obtained. This mixture shows advantages, in the shade of brightening and in the solubility in plastics such as polyethylene, over the individual symmetrical compounds (43) and (45).

EXAMPLE 8

11.7 g of sodium methylate (97% strength) are suspended in 50 ml of dimethylsulphoxide. 41.2 g of 2-(4- bromobutoxy)-benzaldehyde and 37.2 g of 4,4'-bis-(diethoxyphosphonomethyl)-diphenyl are dissolved in 150 ml of dimethylsulphoxide at 70°C and this solution is added dropwise to the above suspension over the course of about 30 minutes at 20° to 25°C. The whole is then stirred for a further 4 hours at 30° to 35°C. The reaction mixture is then poured into 750 ml of water and stirred in an ice bath until the precipitated product has solidified, and this product is filtered off, washed with water and dried in a vacuum cabinet at 60°C. 32.4 g of a product melting at 121° to 134°C are thus obtained. After a single recrystallisation from heptane, with decolourisation with fuller's earth, 25.7 g of a mixture of the compound of the formula

(46) 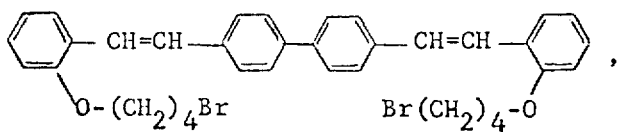

of a compound which is assumed to correspond to the formula

(47) 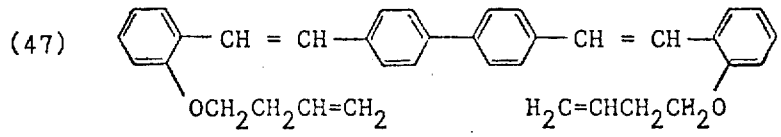

and of a compound of the presumed formula

(48) 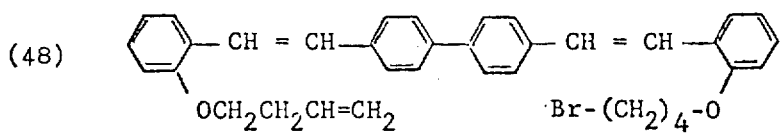

are obtained. Since all three compounds show similar properties, the mixture can be employed, without separation, for brightening organic materials.

The examples listed in Table 1 below can be manufactured in accordance with one of the methods described earlier (see note in last column).

Table 1

| Compound No. | $R_1$ | $R_2$ |
|---|---|---|
| 49 | —H | —OCH$_2$—C$_6$H$_5$ |
| 50 | —H | —OCH$_2$—C$_6$H$_4$—CH$_3$ |
| 51 | —H | —OCH$_2$—C$_6$H$_4$—Cl |
| 52 | —H | —O—(CH$_2$)$_3$—SO$_3$Na |
| 53 | —H | —OCH$_2$COONa |
| 54 | —H | —OCH$_2$COOH |
| 55 | —H | —OCH$_2$COCl |
| 56 | —H | —OCH$_2$COOCH$_3$ |
| 57 | —H | —OCH$_2$COOC$_4$H$_9$(n) |
| 58 | —H | —OCH$_2$—CONH—C$_6$H$_4$Cl |
| 59 | —H | —OCH$_2$COONH$_4$ |
| 60 | —H/—CH$_2$—CH=CH$_2$ | —O(CH$_2$)$_3$—CH$_3$ |
| 61 | —O—(CH$_2$)$_3$—CH$_3$ | —OCH$_3$ |
| 62 | —OCH$_2$—CH=CH$_2$ | —OCH$_3$ |
| 63 | —OCH$_2$—C$_6$H$_5$ | —OCH$_3$ |
| 64 | —OCH$_2$COONa | —OCH$_3$ |

Table 1-continued

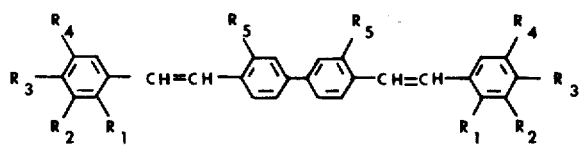

| Compound No. | R₁ | R₂ |
|---|---|---|
| 65 | —OCH₂COOH | —OCH₃ |
| 66 | —O—(CH₂)₃SO₃Na | —OCH₃ |
| 67 | —O—(CH₂)₇—CH₃ | —H |
| 68 | —OCH₂CH(C₂H₅)(CH₂)₄—CH₃ | —H |
| 69 | —O—(CH₂)₁₁—CH₃ | —CH₂—CH=CH₂ |
| 70 | —O—(CH₂)₁₁—CH₃ | —Cl |
| 71 | —O—CH₂—C₆H₄—Cl | —H |
| 72 | —O—CH₂—C₆H₅ | —H |
| 73 | —O—CH₂—C₆H₅ | —CH₂—CH=CH₂ |
| 74 | —O—CH₂—C₆H₅ | —H/—CH₂—CH=CH—CH₃ |
| 75 | —OCH₂—C₆H₅ | —CH₃ |
| 76 | —OCH₂—C₆H₅ | —Cl |
| 77 | —OCH₂—CH=CH₂ | —H |
| 78 | —OCH₂—CH=CH₂ | —Cl |
| 79 | —OCH₂—CH=CH₂ | —CH₃ |
| 80 | —OCH₂—CH=CH₂ | —CH₂—CH=CH₂ |
| 81 | —OCH₂—CH=CH—CH₃ | —H |
| 82 | —OCH₂—O—CH₃ | —H |
| 83 | —OCH₂CH₂OCH₃ | —H |
| 84 | —O—(CH₂)₂OH | —H |
| 85 | —O—(CH₂)₃—CN | —H |
| 86 | —O—(CH₂)₃—SO₃Na | —H |
| 87 | —O—(CH₂)₃—SO₃Na | —H/—CH₂—CH=CH—CH₃ |
| 88 | —O—(CH₂)₃SO₃Na | —CH₃ |
| 89 | —OCH₂COOK | —CH₂—CH=CH₂ |
| 90 | —OCH₂COOH | —CH₃ |
| 91 | —OCH₂COOCH₃ | —H |
| 92 | —OCH₂COO(CH₂)₃—CH₃ | —H |
| 93 | —OCH₂COOCH₂CH(C₂H₅)(CH₂)₃—CH₃ | —H |
| 94 | —OCH₂COO—C₆H₄—CH₃ | —H |
| 95 | —OCH₂CONH—(CH₂)₇—CH₃ | —H |
| 96 | —OCH₂CONH(CH₂)₃—N(CH₃)₂ | —H |
| 97 | —OCH₂CON(C₂H₅)₂ | —H |

| Compound No. | R₃ | R₄ | R₅ | Can be manufactured according to Example |
|---|---|---|---|---|
| 49 | —H | —H | —H | 5 |
| 50 | —H | —H | —H | 6 |
| 51 | —H | —H | —OCH₃ | 6 |
| 52 | —H | —H | —H | 5 |
| 53 | —H | —H | —H | 1 |
| 54 | —H | —H | —H | 2 |
| 55 | —H | —H | —H | 3 |
| 56 | —H | —H | —H | 4 |
| 57 | —H | —H | —H | 4 |

Table 1-continued

Structure: $R_3,R_4$-substituted phenyl—CH=CH—[biphenyl with $R_5,R_5$]—CH=CH—$R_4,R_3$-substituted phenyl (with $R_1, R_2$ positions)

| Compound No. | $R_3$ | $R_4$ | $R_5$ | Can be manufactured according to Example |
|---|---|---|---|---|
| 58 | —H | —H | —H | 4 |
| 59 | —H | —H | —Cl | 2/4 |
| 60 | —CH$_2$—CH=CH$_2$/—H | —H | —H | 6 |
| 61 | —H | —H | —H | 5 |
| 62 | —H | —H | —H | 6 |
| 63 | —H | —H | —H | 6 |
| 64 | —H | —H | —H | 1 |
| 65 | —H | —H | —H | 2 |
| 66 | —H | —H | —H | 5 |
| 67 | —H | —H | —H | 5 |
| 68 | —H | —H | —H | 5 |
| 69 | —H | —H | —H | 6 |
| 70 | —H | —Cl | —H | 6 |
| 71 | —H | —H | —H | 6 |
| 72 | —H | —H | —H | 5 |
| 73 | —H | —H | —H | 6 |
| 74 | —H | —CH$_2$—CH=CH—CH$_3$/—H | —H | 6 |
| 75 | —H | —C(CH$_3$)$_3$ | —H | 6 |
| 76 | —H | —Cl | —H | 6 |
| 77 | —H | —Br | —H | 6 |
| 78 | —H | —Cl | —CH$_3$ | 5 |
| 79 | —H | —CH$_3$ | —H | 6 |
| 80 | —H | —CH$_2$—CH=CH$_2$ | —H | 5 |
| 81 | —H | —H | —H | 6 |
| 82 | —H | —H | —H | 6 |
| 83 | —H | —H | —H | 6 |
| 84 | —H | —H | —H | 6 |
| 85 | —H | —H | —H | 6 |
| 86 | —H | —H | —H | 5 |
| 87 | —H | —CH$_2$—CH=CH—CH$_3$/—H | —H | 6 |
| 88 | —H | —CH$_3$ | —H | 5 |
| 89 | —H | —H | —H | 1 |
| 90 | —H | —C(CH$_3$)$_3$ | —H | 1,2 |
| 91 | —H | —H | —H | 4 |
| 92 | —H | —H | —H | 4 |
| 93 | —H | —H | —H | 4 |
| 94 | —H | —H | —H | 4 |
| 95 | —H | —H | —H | 4 |
| 96 | —H | —H | —H | 4 |
| 97 | —H | —H | —H | 4 |

The following text presents, by way of examples, a series of possible uses of the class of compounds claimed, without thereby intending to impose a restriction; compounds with copolymerisable or co-condensable groups, such as allyl, carboxyl or carbalkoxy can, if the addition to the organic material to be brightened is carried out appropriately, become copolymerised or co-condensed and thereby more resistant to migration.

EXAMPLE 9

Bleached cotton fabric is washed for 30 minutes, using a liquor ratio of 1:30, in a liquor heated to 60°C, which contains the following additives per liter:

0.032 g of the brightener of the formula (36)
1 g of active chlorine (bleach solution)
4 g of a washing powder of the following composition:

15.00% of dodecylbenzenesulphonate
10.00% of sodium laurylsulphonate
40.00% of sodium tripolyphosphate
25.75% of anhydrous sodium sulphate
7.00% of sodium metasilicate
2.00% of carboxymethylcellulose and
0.25% of ethylenediaminetetraacetic acid.

After rinsing and drying, the fabric shows a strong brightening effect of good fastness to acid and to chlorine.

The washing powder of the abovementioned composition can also contain the brightener of the formula (36) incorporated directly.

A strong brightening effect is also achieved if the washing process is carried out for 30 minutes at 20°C.

Similar results are obtained with the compounds of the formulae (37), (64), (65), (66) or (86).

EXAMPLE 10

Cut pieces of polyamide 6, bleached wool and "Koratron"—finished cotton are together treated for 10 minutes at 30°C, using a liquor ratio of 1:20 in a bath which contains 0.1% of the brightener of the formula (37), calculated relative to the fibre material, and 0.5 g/l of sodium fluosilicate.

After rinsing and drying, the three fibre materials show a strong brightening effect of good fastness to light.

Similar results are obtained when using the compounds of the formulae (36), (66), (86) or (96).

EXAMPLE 11

A cotton article provided with a non-iron finish by means of an aminoplast resin is washed for 15 minutes, using a liquor ratio of 1:20, in a liquor warmed to 50°C which contains the following additives per liter: 0.004 to 0.016 g of a brightener of the formula (36), 4 g of a washing powder of the following composition:

15.00% of dodecylbenzenesulphonate
10.00% of sodium laurylsulphonate
40.00% of sodium tripolyphosphate
25.75% of anhydrous sodium sulphate
7.00% of sodium metasilicate
2.00% of carboxymethylcellulose and
0.25% of ethylenediaminetetraacetic acid.

After rinsing and drying, the fabric shows a higher degree of whiteness in daylight than does the untreated material.

Similar results are obtained when using one of the compounds of the formulae (37), (53), (54), (61), (64), (65), (66), (86) or (96).

EXAMPLE 12

Brightening of cotton fabric in a rinsing bath containing an agent for imparting a soft handle:

Stock solution: 0.05 g of the compounds of the formula (88) is dissolved in 5 ml of a mixture of alcohol and dimethylformamide (1:1) and added to 20 ml of a 4% strength aqueous solution of di-(octadecyl)-dimethyl-ammonium chloride.

Bleached cotton fabric is rinsed for 10 minutes at 20° to 25°C, using a liquor ratio of 1:20, in an aqueous liquor which contains 5% of the above stock solution, and is subsequently dried at 80°C. The fabric is strongly brightened, without a greenish tinge.

The compounds of the formulae (36), (37), (41), (67), (68), (69), (80), (86), (87), (88), (89) or (93) give similar effects.

EXAMPLE 13

A polyamide fibre fabric (Perlon Helanca) is washed for 15 minutes, using a liquor ratio of 1:20 in a liquor warmed to 50°C which contains the following additives per litre:

0.004 to 0.016 g of the brightener of the formula (66),
0.25 g of active chlorine (bleach solution)
4 g of a washing powder of the following composition:
15.00% of dodecylbenzenesulphonate
10.00% of sodium laurylsulphonate
40.00% of sodium tripolyphosphate
25.75% of anhydrous sodium sulphate
7.00% of sodium metasilicate
2.00% of carboxymethylcellulose and
0.25% of ethylenediaminetetraacetic acid.

The polyamide fibre fabric is only introduced into the wash bath, warmed to 50°C, 15 minutes after preparation of the latter. After rinsing and drying, the fabric shows a good brightening effect of good fastness to light.

A good brightening effect is also obtained if the washing process is carried out in the same manner, but at 25°C.

The washing powder of the abovementioned composition can also contain the brightener of the formulae indicated above incorporated directly.

Similar results are obtained when using the compounds of the following formulae: (36), (37), (52), (62), (64), (65), (67), (82), (86) or (97).

EXAMPLE 14

Polyacrylonitrile fibres (Orlon 42 or Courtelle) are introduced, using a liquor ratio of 1:40, into an aqueous bath which per litre contains 1 g of 85% strength formic acid and 0.2% of the compound of the formula (96), calculated relative to the fibre weight. The treatment bath is heated to the boil over the course of 30 minutes and is kept at this temperature for a further 30 to 60 minutes. After rinsing and drying, polyacrylonitrile fibres showing an excellent brightening effect are obtained.

Good brightening effects are also obtained if Courtelle fibres are treated in accordance with this example.

EXAMPLE 15

A polyamide fibre fabric (Perlon) is introduced, using a liquor ratio of 1:40, into a bath at 60°C which contains 0.1% (relative to the weight of fabric) of the brightener of the formula (97) and also contains, per litre, 1 g of 80% strength acetic acid and 0.25 g of an addition product of 30 to 35 mols of ethylene oxide to one mol of technical stearyl alcohol. The mixture is warmed to the boil over the course of 30 minutes and kept at the boil for 30 minutes. After rinsing and drying, a strong brightening effect of good fastness to light is obtained.

If instead of the polyamide-6 fabric a polyamide-6,6 (Nylon) fabric is used, similar good brightening effects are obtained.

Finally, the treatment can be carried out under HT-conditions, for example for 30 minutes at 130°C. For this type of use, it is advisable to add 3 g/l of hydrosulphite to the liquor.

Similar results are obtained with the compounds of the formulae (36), (37), (43), (45), (52), (53), (54), (56), (57), (62) to (67), (73) (82), (86) and (92).

EXAMPLE 16

Polypropylene fibres or polyethylene fibres are treated, using a liquor ratio of 1:40, with 0.02 to 0.4% of the compound of the formula (68), (73) or (82) for 60 minutes, at 60 to 100°c, in a bath which per litre contains 5 g of an addition product of about 35 mols of ethylene oxide to 1 mol of octadecyl alcohol and 0.5 g of trisodium phosphate. The material is then rinsed and dried. The polyolefine fibres thus obtained possess a substantially higher degree of whiteness than the untreated fibres.

If instead of 0.5 g of trisodium phosphate 1 g of 85% strength formic acid is used, a similar effect is obtained.

EXAMPLE 17

A cellulose acetate fabric is introduced, using a liquor ratio of 1:30 to 1:40, into an aqueous bath at 50°C which contains 0.15% of the bis-stilbene compound of the formula (36), relative to the fibre material. The temperature of the treatment bath is brought to 90°–95°C and maintained thereat for 30 to 45 minutes. After rinsing and drying, a good brightening effect is obtained.

Similar effects are achieved with the compounds of the formula (37), (64), (65), (89), (90), (96) or (97).

EXAMPLE 18

Bleached wool fabric is treated, using a liquor ratio of 1:40, for 60 minutes in a bath which contains 0.1 to 0.4% of the brightener of the formulae (66), (86) or (96), calculated relative to the fibre weight, and 4 g/l of hydrosulphide. After rinsing and drying, strong brightening effects of good fastness to light are obtained.

Strong brightening effects are also obtained if instead of the hydrosulphite 5% of acetic acid, calculated relative to the fibre weight, are added to the bath.

EXAMPLE 19

A nylon-6 fabric is impregnated with the following liquor at room temperature on a padder, and squeezed out to a weight increase of 140%: 5 g/l of the brightener of the formula (41), (43), (45), (57), (62), (73), (91), (92), (94), (95) or (97), 5 g/l of lactic acid and 20 g/l of the reaction product of 1 mol of diethanolamine to coconut fatty acid, made up to one litre with perchloroethylene. The brightener is worked into a paste with the surface-active agent and the lactic acid and is then added to the organic solvent.

Following the padding and drying, the fabric is steamed for 3 minutes at 120°C.

The substrate shows a good brightening effect.

Instead of the steaming process, the fabric can also be thermofixed for 30 seconds at 190°C.

EXAMPLE 20

A fabric of polyvinyl chloride fibres ("Thermovyl") is padded at room temperature (about 20°C) with an aqueous dispersion which per litre contains 1 to 2 g of the compound of the formula (92) and 1 g of an addition product of about 35 mols of ethylene oxide to 1 mol of octadecyl alcohol, and is dried at about 70°C. The dry material is subsequently subjected to a heat treatment for 3 minutes at 100°C. The fabric of polyvinyl chloride fibres treated in this way has a substantially higher degree of whiteness than an untreated fabric of polyvinyl chloride fibres.

Similar results are achieved with the compounds of the formulae (43), (57), (61), (62), (67), (93), (94) or (97).

EXAMPLE 21

A polyester fabric (for example "Dacron") is padded at room temperature (about 20°C) with an aqueous dispersion which per litre contains 0.1 to 1 g of the compound of the formula (56) and 1 g of an addition product of about 35 mols of ethylene oxide to 1 mol of octadecyl alcohol, and is dried at about 100°C. The dry material is subsequently subjected to a heat treatment at about 220°C for 30 seconds. The polyester fabric treated in this way shows a strong optical brightening effect.

Similar results are obtained on using the compounds of the formulae (57), (58), (73), (82) or (95).

EXAMPLE 22

10,000 g of a polyamide in chip form, manufactured in a known manner from hexamethylenediamine adipate, are mixed with 30 g of titanium dioxide (rutile modification) and 5 g of the compound of the formula (68) for 12 hours in a tumbler vessel.

The chips treated in this way are fused in a kettle heated to 300°–310°C by means of oil or diphenyl vapour, after displacing the atmospheric oxygen by steam, and the material is stirred for half an hour. The melt is thereafter extruded through a spinneret under a nitrogen pressure of 5 atmospheres gauge and the filament which has been spun in this way and cooled is wound up on a spinning bobbin. The filaments produced show an excellent brightening effect of good fastness to light.

If instead of a polyamide manufactured from hexamethylenediamine adipate a polyamide manufactured from ε-caprolactam is used, similarly good results are obtained.

Similar results are achieved with the compound of the formula (36), (37), (40), (45), (49), (52) to (57), (61), (67), (72), (86) or (91) to (97).

EXAMPLE 23

100 g of "fibre grade" polypropylene are intimately mixed with 0.8 g of the compound of the formula (68) and the mixture is fused at 280° to 290°C whilst stirring. The melt is spun through customary spinnerets in accordance with melt spinning processes which are in themselves known, and the spun material is stretched.

Strongly brightened polypropylene fibres are obtained.

Similar results are achieved with the compounds of the formulae (49), (57), (61), (62), (63) or (92) to (95).

EXAMPLE 24

A 13% strength casting composition of acetylcellulose in acetone which contains — relative to the dry weight of plastic — 2% of anatase (titanium dioxide) as a delustring agent and 0.04% of the compound of the formula (72), is cast on a glass plate and spread by means of a metal rod to give a thin film. After drying, the film shows a substantially higher degree of whiteness than a film manufactured in the same way which does not contain an optical brightener.

Similar results are obtained on using the compounds of the formulae (43), (45), (56), (57), (62), (63), (91) to (94) or (97).

EXAMPLE 25

100 parts of polystyrene and 0.1 part of the compound of the formula (93) are fused in a tube of 1 cm diameter for 20 minutes at 210°C, with exclusion of air. After cooling, an optically brightened polystyrene composition of good fastness to light are obtained.

Similar brightening effects are obtained when using a compound of the formulae (57), (62), (63), (67), (68), (91), (92) or (94).

EXAMPLE 26

100 parts of polyethylene are milled on a calender, warmed to 130°C, to give a homogeneous hide. 0.02 part of the compound of the formula (61) are worked into this hide slowly. After the optical brightener has become uniformly distributed, the hide is pulled off the calender and then pressed in a heating press at 130° to 135°C to give sheets.

Strong brightening effects are obtained. The compounds of the formulae (62), (63), (68) or (80) can be employed in the same way.

EXAMPLE 27

1.5 g of a delustring agent, 1 g of titanium dioxide (rutile type) and 0.05 g of the compound of the formula (43) are stirred into a polyurethane coating composition of 13.3 g of isocyanate-modified polyester, 26.7 g of ethyl acetate, 2 g of a reaction accelerator and 2 g of polyfunctional isocyanate as a crosslinking agent. This mixture is left to stand for 2 hours and is then spread by means of a knife or a film-spreading rod onto a cotton fabric (wet film thickness 1 mm). Thereafter the coating is dried for 24 hours at room temperature. The fabric coated in this way shows a strong optical brightening effect.

Similar results are obtained on using the compounds of the formulae (45), (63), (68), (72), (92) to (94) or (97).

EXAMPLE 28

An intimate mixture of 100 parts of polyvinyl chloride, 3 parts of stabiliser (Advastat BD 100: Ba/Cd complex), 2 parts of titanium dioxide, 59 parts of dioctyl phthalate and 0.01 to 0.2 part of the compound of the formula (43) are milled on a calender at 150° to 155°C to give a sheet. The opaque polyvinyl chloride sheet thus obtained has a substantially higher degree of whiteness than a sheet which does not contain the optical brightener.

The compounds of the formulae (45), (49), (53), (56) to (58), (61) to (65), (67), (68), (72), (91) to (97) give similar effects.

EXAMPLE 29

7 g of anatase (TiO$_2$) followed by 350 g of polyacrylonitrile polymer (=PAC) in powder form are added to 1,400 ml of dimethylformamide; the mixture is converted into a viscous mass by means of a high speed stirrer.

5 mg of the compound of the formula (56) are added to 50 g of this 20% strength PAC solution. This mixture is homogenised by stirring and is then left to stand for 1 hour in order to allow the air bubbles produced to diffuse out.

Thereafter the composition is cast on a glass plate and spread by means of a metal rod to give a uniform film.

The PAC film is then dried in a drying cabinet for approx. 15 minutes at 50°C with ventilation (air extraction) and then at room temperature with slight ventilation. The PAC film can then be removed easily from the glass plate. It has a substantially higher degree of whiteness than the film manufactured in the same way which does not contain the optical brightener.

Similar results are obtained when using the compounds of the formulae (37), (43), (45), (53), (54), (58), (62), (72), (86), (91) (92), (94), 96) or (97).

I claim:

1. Bis-stilbene compounds of the formula

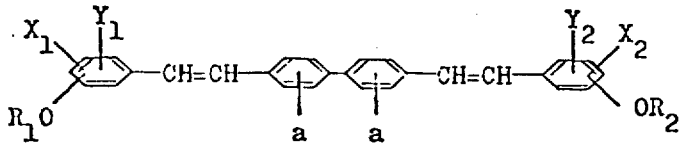

wherein $R_1$ and $R_2$ are identical or different and denote alkyl with 5 to 18 carbon atoms, substituted alkyl with a total of 2 to 20 carbon atoms of which the substituents are phenyl or phenyl substituted by lower alkyl or halogen, or alkenyl with 3 to 4 carbon atoms, $X_1$ and $X_2$ are identical or different and denote hydrogen, alkoxy with 1 to 4 carbon atoms, halogen, alkenyl with 3 to 4 carbon atoms or alkyl with 1 to 4 carbon atoms, $Y_1$ and $Y_2$ are identical or different and denote hydrogen, halogen, alkenyl with 3 to 4 carbon atoms or alkyl with 1 to 4 carbon atoms, a represents hydrogen, halogen, alkoxy with 1 to 4 carbon atoms or alkyl with 1 to 4 carbon atoms, and the parapositions are free of alkoxy groups or $R_1O-$ and $R_2O-$ groups.

* * * * *